US007802401B2

(12) United States Patent
Wild et al.

(10) Patent No.: US 7,802,401 B2
(45) Date of Patent: Sep. 28, 2010

(54) WINDOW REGULATOR WITH IMPROVED CARRIER

(75) Inventors: Brian J. Wild, Ferndale, MI (US); Shigeki Arimoto, Bloomfield, MI (US)

(73) Assignee: Hi-Lex Corporation, Rochester Hills, MI (US)

( * ) Notice: Subject to any disclaimer, the term of this patent is extended or adjusted under 35 U.S.C. 154(b) by 993 days.

(21) Appl. No.: 11/171,683

(22) Filed: Jun. 30, 2005

(65) Prior Publication Data

US 2007/0000178 A1 Jan. 4, 2007

(51) Int. Cl.
*B60J 1/16* (2006.01)

(52) U.S. Cl. .......................................... 49/375; 49/352

(58) Field of Classification Search ................... 49/348, 49/349, 352, 375, 502, 374, 377
See application file for complete search history.

(56) References Cited

U.S. PATENT DOCUMENTS

| | | | | |
|---|---|---|---|---|
| 2,914,315 | A * | 11/1959 | Wise | 49/349 |
| 3,014,715 | A * | 12/1961 | Martens | 49/349 |
| 3,228,677 | A * | 1/1966 | Martens | 49/41 |
| 3,400,489 | A * | 9/1968 | Stenger et al. | 49/348 |
| 4,663,886 | A * | 5/1987 | Nakamura et al. | 49/360 |
| 5,050,348 | A * | 9/1991 | Kane et al. | 49/351 |
| 5,101,596 | A * | 4/1992 | Moore | 49/351 |
| 5,497,578 | A * | 3/1996 | Wautelet et al. | 49/349 |
| 5,809,695 | A * | 9/1998 | Strickland | 49/352 |
| 5,950,365 | A * | 9/1999 | Lieb et al. | 49/28 |
| 6,233,873 | B1 * | 5/2001 | Lawrie et al. | 49/375 |
| 6,305,129 | B1 * | 10/2001 | Eckhardt et al. | 49/502 |
| 6,354,652 | B1 * | 3/2002 | Arquevaux et al. | 296/146.5 |
| 6,397,524 | B1 * | 6/2002 | Sakaguchi et al. | 49/375 |
| 6,430,873 | B1 * | 8/2002 | Borchuk et al. | 49/352 |
| 6,453,615 | B1 * | 9/2002 | Berta et al. | 49/349 |
| 6,510,657 | B1 * | 1/2003 | Bertolini et al. | 49/502 |
| 6,516,493 | B1 * | 2/2003 | Seliger et al. | 16/96 R |
| 6,519,898 | B2 * | 2/2003 | Tatsumi et al. | 49/375 |
| 6,557,302 | B1 * | 5/2003 | Kaps | 49/375 |

(Continued)

*Primary Examiner*—Katherine W Mitchell
*Assistant Examiner*—Catherine A Kelly
(74) *Attorney, Agent, or Firm*—Young Basile Hanlon & MacFarlane PC

(57) ABSTRACT

A window regulator for raising and lowering a window glass in a motor vehicle. The regulator includes at least one rail defining at least one track, at least one glass carrier for receiving the window glass and mounted for movement along the at least one track, at least one cable where the at least one cable is attached to the at least one glass carrier generally parallel to the at least one track, and a drive unit for operably engaging the at least one cable to move the at least one glass carrier along the at least one track. The cable attachment includes at least one aperture of the glass carrier for receiving an end of the at least one cable and at least one elongated aperture of the glass carrier for receiving a length of the at least one cable generally parallel to the at least one track. The glass carrier additionally includes a cushioned support member for supporting the lower edge of the window glass. The cushioned support member includes a horizontally extending member, which includes a retaining member, and a cushion received by the horizontally extending member and secured by the retaining member. The cushion is formed from a polypropylene material, which is a different material than the horizontally extending member.

5 Claims, 6 Drawing Sheets

U.S. PATENT DOCUMENTS 6,574,922 B2 * 6/2003 Velthaus et al. ............... 49/352
6,698,140 B2 * 3/2004 Tatsumi et al. ................ 49/502
6,766,618 B2 * 7/2004 Cardine et al. ................ 49/502
6,796,085 B2 * 9/2004 Smith .......................... 49/352
6,854,213 B2 * 2/2005 Galliani ....................... 49/375
6,874,279 B1 * 4/2005 Weber et al. .................. 49/352
7,263,804 B2 * 9/2007 Ishii et al. ..................... 49/352
2002/0050100 A1 * 5/2002 Tatsumi et al. ................ 49/375
2002/0083647 A1 * 7/2002 Bostian et al. ................ 49/352
2004/0107645 A1 * 6/2004 Galliani ....................... 49/375
2004/0128917 A1 * 7/2004 Lin et al. ...................... 49/502
2004/0144032 A1 * 7/2004 Smith .......................... 49/352
2004/0154227 A1 * 8/2004 Yoshimura ................... 49/352
2005/0081448 A1 * 4/2005 Ishii et al. ..................... 49/352
2005/0150166 A1 * 7/2005 Seksaria et al. ............... 49/352

* cited by examiner

WINDOW REGULATOR WITH IMPROVED CARRIER

FIELD OF THE INVENTION

This invention relates generally to window regulators for use in raising and lowering window glasses in motor vehicles and more specifically, to window regulators with an improved carrier.

BACKGROUND

Motor vehicles include a plurality of window glasses and a corresponding plurality of window regulators to raise and lower the window glasses either manually or with a power assist. Whereas a myriad of window regulators have been proposed and/or utilized in raising and lowering the windows of motor vehicles, each of the prior art devices has suffered from one or more disadvantages.

Specifically, the prior art regulators can be very complicated, relatively maintenance prone, relatively heavy, relatively large and/or relatively erratic in operation. The complicated construction adds to the cost of manufacture and assembly and thereby adds to the ever increasing cost of the associated motor vehicle. The maintenance problems exacerbate the problems of motor vehicle ownership. The relatively heavy devices add to the weight of the vehicle and thereby lower the gas mileage of the vehicle. The relatively large size complicates the use of the regulator in the evermore narrow profiles of the doors of modem day motor vehicles. Finally, the relatively erratic operation is annoying and inconvenient.

SUMMARY

The present invention is a window regulator for raising and lowering a window glass of a motor vehicle. The regulator includes at least one rail defining at least one track, at least one glass carrier for receiving the window glass and mounted for movement along the at least one track, at least one cable, means for attaching the at least one cable to the at least one glass carrier generally parallel to the at least one track, and a drive unit for operably engaging the at least one cable to move the at least one glass carrier along the at least one track. The cable attaching means can include at least one aperture of the glass carrier for receiving an end of at least one cable and at least one elongated aperture of the glass carrier for receiving a length of the at least one cable. The drive unit can include a drum operably engaged with the at least one cable and a motor connectible to the drum for rotatably moving the drum.

The glass carrier includes a clamp for receiving a lower edge of the window glass and a slide connectible to the clamp and mountable to the at least one rail to allow sliding movement along the at least one track. The clamp can be a generally U-shaped upwardly opening clamp. The clamp can be formed of a metallic material and the slide can be formed of a plastic material. The glass carrier can additionally include a cushioned support member for supporting the lower edge of the window glass.

The cushioned support member can include a horizontally extending member, which can include a retaining member, and a cushion receivable by the horizontally extending member and securable by the retaining member. The cushion can be formed from a different material than the horizontally extending member.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 8 is an exploded side view of a drive unit of the regulator; and.

DETAILED DESCRIPTION

Figure 1:
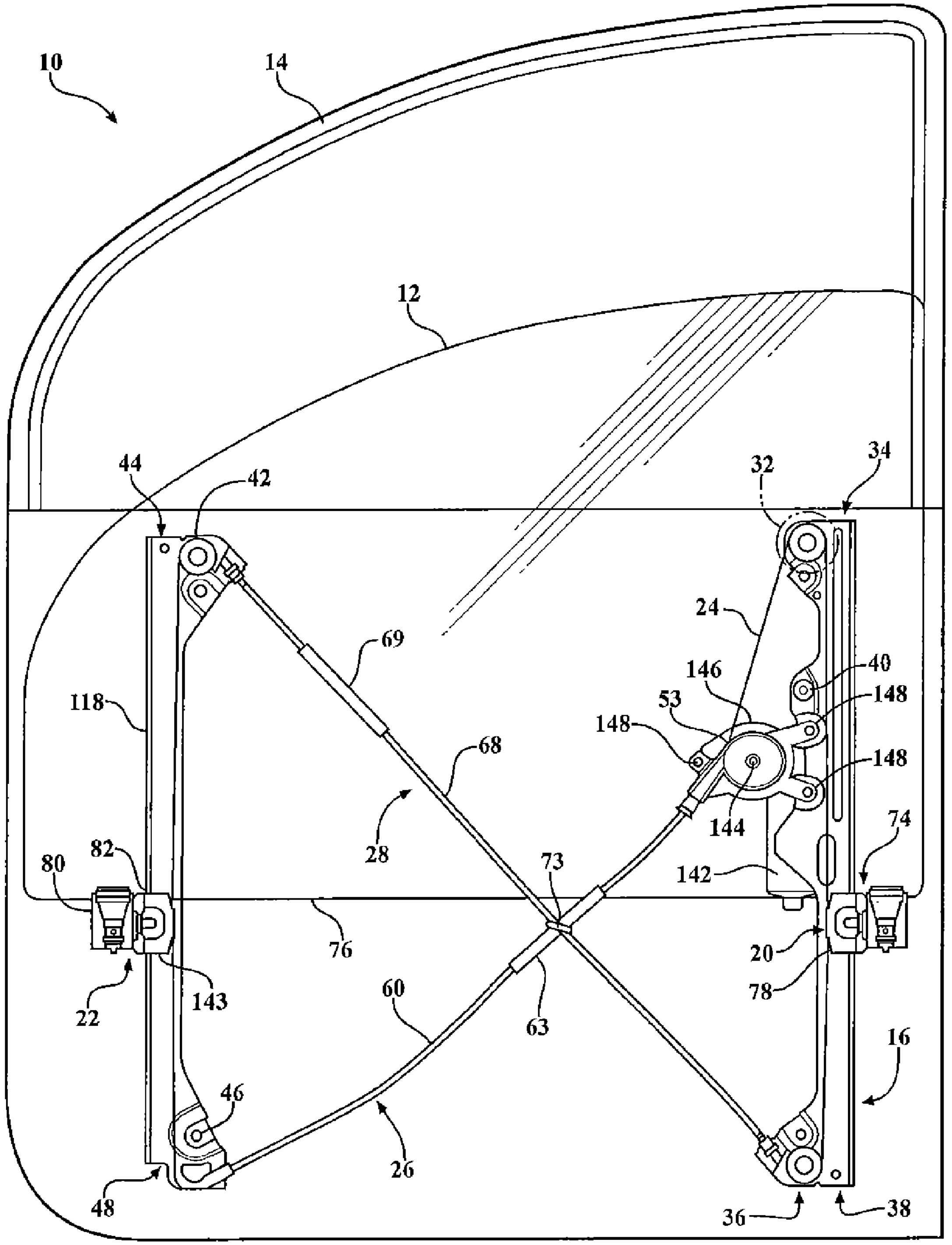
FIG. 1 is a front elevational view of a window regulator including a first rail, a second rail, a first glass carrier and a second glass carrier shown in association with a motor vehicle door.

Referring to the drawings, a window regulator 10 for raising and lowering a window glass 12 of a motor vehicle is shown in FIGS. 1-8. As seen in FIG. 1, the regulator 10 is installed in a door 14. The regulator 10 includes a first rail 16, a second rail 18, a first glass carrier 20, a second glass carrier 22, a first cable 24, a second cable 26, a third cable 28, and a drive unit 30 for operably engaging the first cable 24 and the second cable 26 to move the first glass carrier 20 and the second glass carrier 22 along the first rail 16 and the second rail 18, respectively.

The first rail 16 and the second rail 18 are positioned in a generally vertical orientation i.e., along the path of travel of the window, and are located generally parallel to each other. The first rail 16 defines a track with respect to the door 14 for the first glass carrier 20. The second rail 18 defines a track with respect to the door 14 for the second glass carrier 22. The first rail 16 includes a first cable guide 32 located proximate to an upper edge 34 of the first rail 16 and a second cable guide 36 located proximate to a lower edge 38 of the first rail 16. The first rail 16 also includes a generally circular bumper 40 to prevent direct contact between the window glass 12 and the first rail 16. The second rail 18 includes a first cable guide 42 located proximate to an upper edge 44 of the second rail 18 and a second cable guide 46 located proximate to a lower edge 48 of the second rail 18. The cable guides each compromise generally a pair of wheels or rails which guide the cable.

Figure 3:
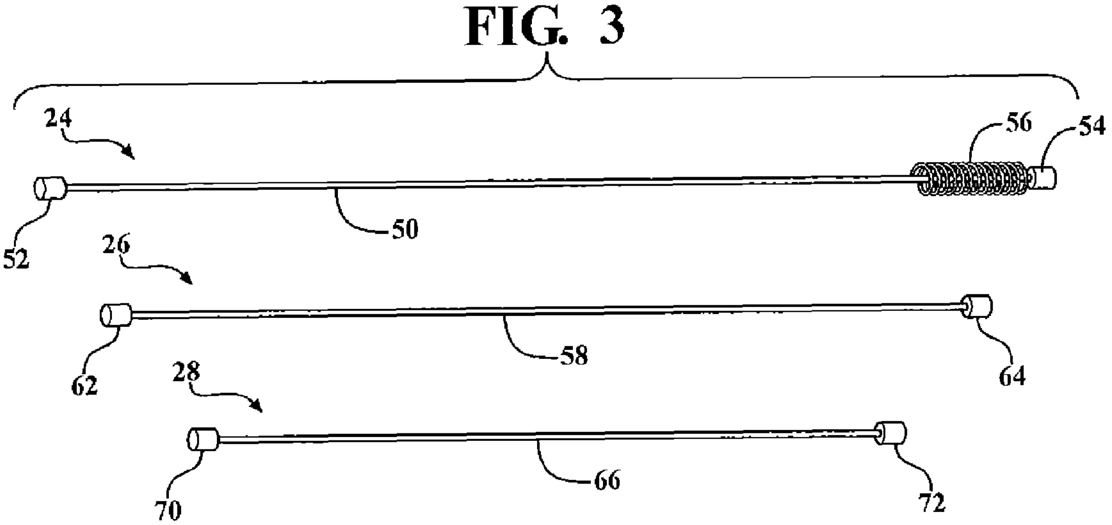
FIG. 3 is a simplified schematic of a first cable length, a second cable length, and a third cable length of the regulator.

As shown in FIGS. 1 and 3, the first cable 24 includes a first cable length 50 including a first cable end 52 and a second cable end 54 where the second cable end 54 includes a cable spring 56 for reducing slack in the cable system, vibration, and jerking movement of the window glass 12 when the window glass 12 is raised and lowered. The first cable 24 is operably engaged at the first cable end 52 to a drum 53, shown in phantom in FIG. 1, of the drive unit 30. The first cable 24 extends to and is received by the first cable guide 32 of the first rail 16 and is attached generally parallel to the track defined by the first rail 16 at the second cable end 54 to the first carrier 20 as discussed below. The second cable 26 includes a second cable length 58 and a first conduit 60 where the second cable length 58 includes a first cable end 62 and a second cable end 64, and where the second cable length 58 is enclosed by the first conduit 60. As shown, the first conduit 60 includes a first conduit sleeve 63 for protection of the conduit 60 and/or for noise and vibration reduction where the conduit 60 is received by the sleeve 63. The second cable 26 is operably engaged at the first cable end 62 to the drum 53. The second cable 26 is received by the second guide 46, then extends generally parallel to the second rail 18 such that the second cable end 64 engages with the second carrier 22 as discussed below. The third cable 28 includes a third cable length 66 and a second conduit 68, which includes a second conduit sleeve 69. The third cable length 66 includes a first cable end 70 and a second cable end 72, and the third cable length 66 is received by the second conduit 68. The third cable 28 is attached generally parallel to the second rail 18 so that first cable end 70 is connected to the second carrier 22 as discussed below. The third cable 28 is then received by the first cable guide 42, is received by the second cable guide 36, and is attached generally parallel to the first rail 16 so that the second cable end 72 is connected to the first carrier 20 as discussed below. As shown, the conduits 60, 68 are positioned in a generally X-shaped arrangement and are connected using a c-ring 73 or any such suitable connector as is known in the industry.

As shown in FIG. 1, the first glass carrier 20 includes a generally U-shaped upwardly opening clamp 74 for receiving a lower edge 76 of the window glass 12 and a slide 78 connectible to the clamp 74 and mountable to the first rail 16 to allow sliding movement of the first glass carrier 20 along the first rail 16. The second glass carrier 22 similarly includes a generally U-shaped upwardly opening clamp 80 for receiving the lower edge 76 of the window glass 12 and a slide 82 connectible to the clamp 80 and mountable to the second rail 18 to allow sliding movement of the second glass carrier 22 along the second rail 18. The clamp 74 of the first glass carrier 20 is a mirror image of the clamp 80 of the second glass carrier 22, so only the clamp 80 will be discussed herein. The clamps 74, 80 are formed, for example, of a metallic material, and the slides 78, 82 are formed, for example, of a plastic material.

Figure 2:
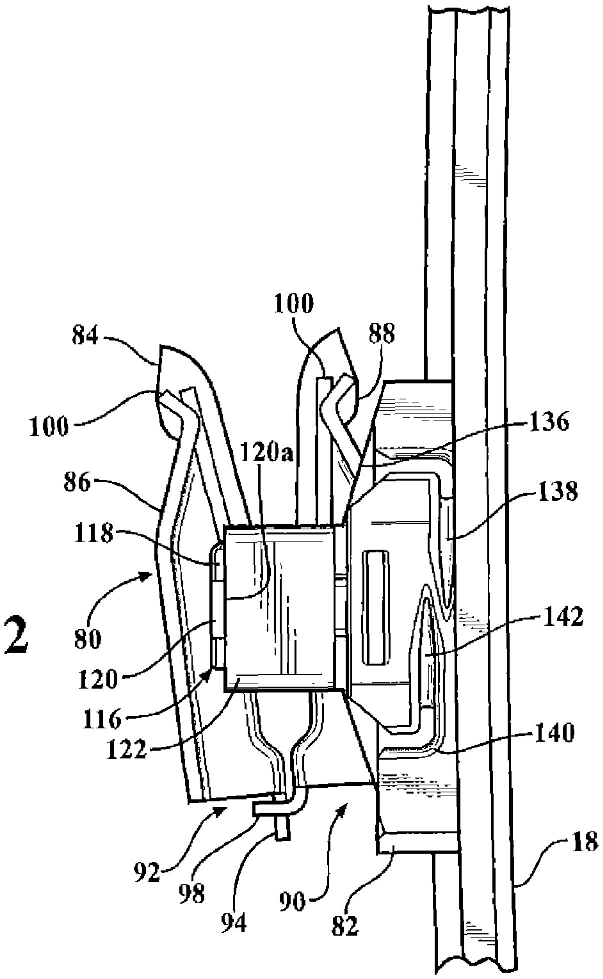
FIG. 2 is a partial side elevational view of the second glass carrier associated with the second rail.
Figure 4:
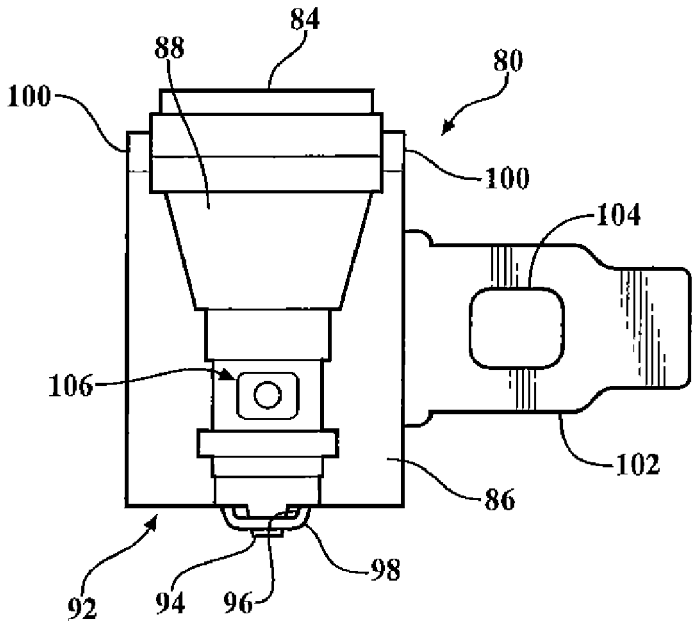
FIG. 4 is a front elevational view of a clamp of the second glass carrier.
Figure 5:
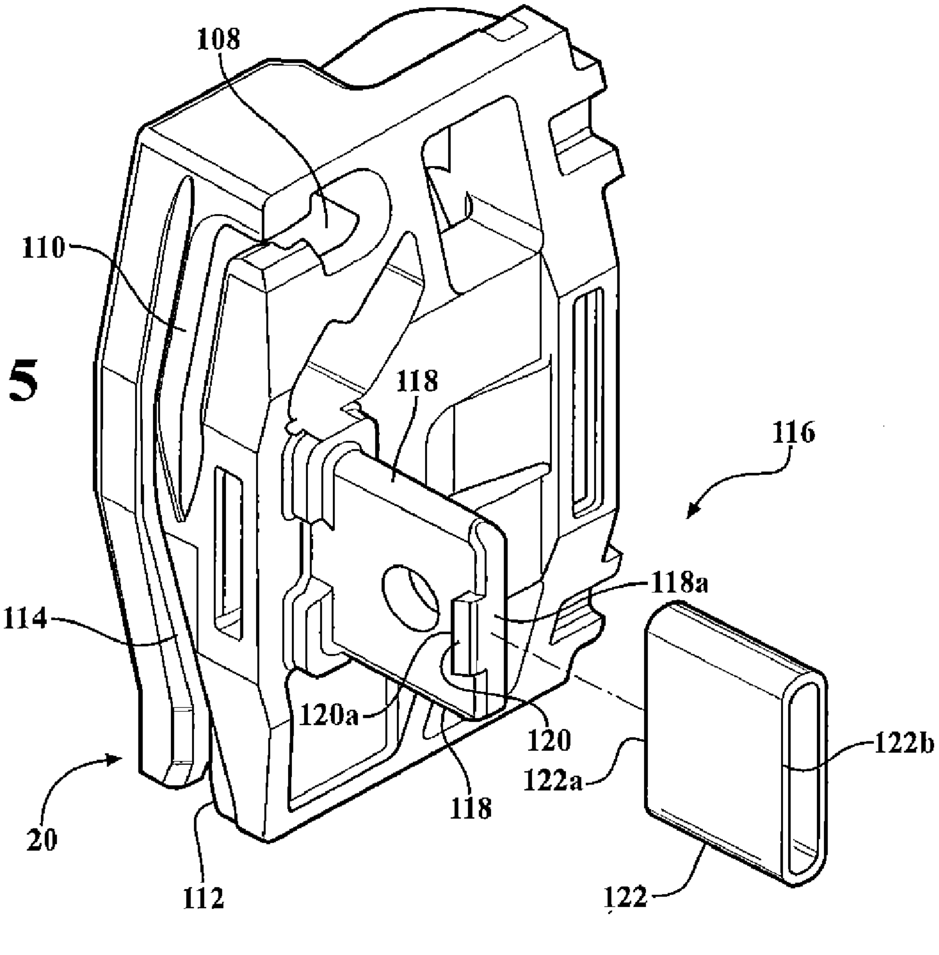
FIG. 5 is an exploded isometric view of a slide of the first glass carrier as seen from the direction of arrow 2 of FIG. 1.
Figure 6:
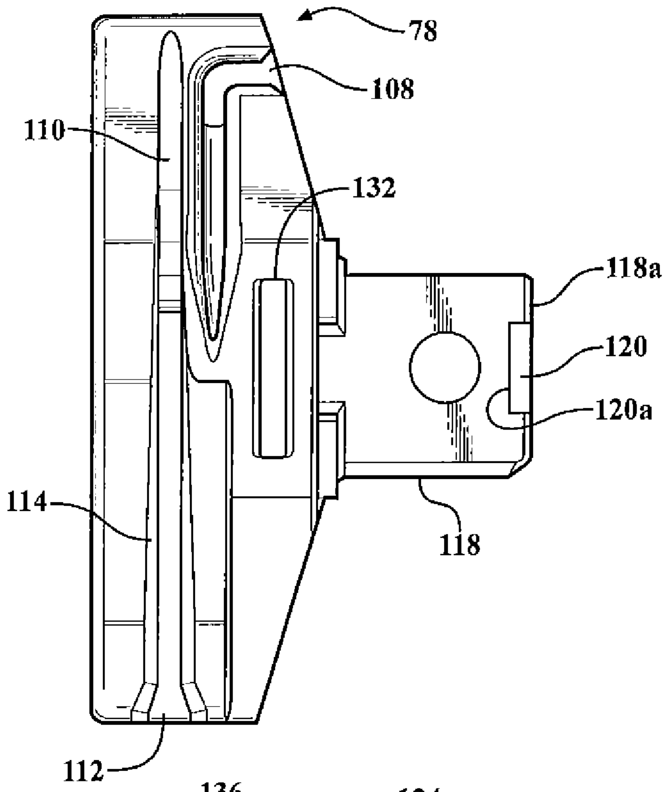
FIG. 6 is a side view of a slide of the first glass carrier as seen from the direction of arrow 2 of FIG. 1.
Figure 7:
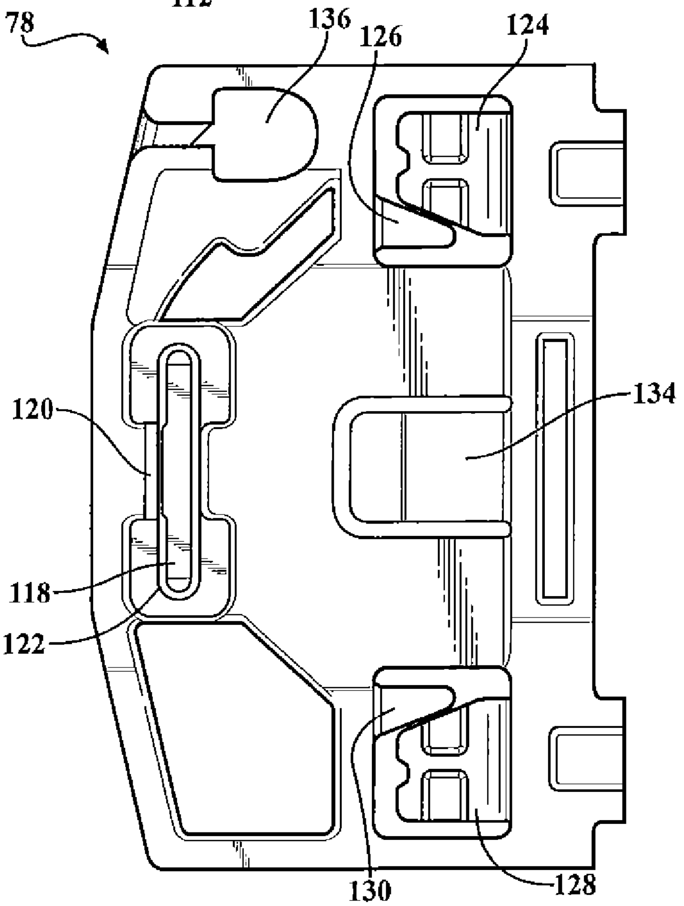
FIG. 7 is a front view of the slide of the first glass carrier.

As seen in FIGS. 2 and 4, the clamps 74, 80 each include a clamp cushion 84, which is formed from a different material than a material of the clamps 74, 80. The material of the clamp cushion 84 is preferably a material that has a higher coefficient of friction than the material of the clamps 74, 80, is more elastic than the material of the clamps 74, 80, or both. The clamp 80 is generally rectangular and includes a first half 86 and a second half 88. The second half 88 is pivotably attached at a bottom edge 90 to a bottom edge 92 of the first half. The halves 86, 88 are pivotably attached by inserting a tab 94 of the first half 86 into an aperture 96 formed in an extension 98 of the second half 88. The first half 86 and the second half 88 each include two extensions 100 located proximate to respective top edges. The extensions 100 are located on opposite sides relative to the clamp cushion 84 to prevent lateral movement of the clamp cushion 84 relative to the clamp 80. The second half 88 includes a generally rectangular slide connection member 102 having a generally rectangular slide retainer aperture 104 (shown only in FIG. 4). The clamp halves 86, 88 are additionally attached using an adjustable fastener 106, which can be used to vary a clamping force exerted by the clamp 80 on the window glass 12. The adjustable fastener 106 is a nut and bolt combination receivable by the halves 86, 88 or any such fastener as is known in the industry.

As seen in more detail in FIGS. 5-7 and 9, the slide 78 of the first glass carrier 20 includes a generally circular first aperture or bore 108 associated with an elongated second aperture or first channel 110, and a generally rectangular angled third aperture or pocket 112 associated with an elongated fourth aperture or second channel 114. Both the first and second channels, 110, 114, respectively, are generally parallel to the track defined by the first rail 16. The second end 72 of the third cable 28 is received by the first bore 108 and the third cable length 66 is received by the first channel 110 to attach the third cable 28 to the slide 78, and thus to the first glass carrier 20, in a generally parallel orientation relative to the first rail 16. The second end 54 of the first cable 24, including the cable spring 56, is received by the pocket 112. The pocket 112 extends at an angle into the interior of the slide 78 to form the second channel 114, and the first length 50 is received by the second channel 114 to attach the first cable 24 to the slide 78, and thus to the first glass carrier 20, in a generally parallel orientation relative to the first rail 16.

The slide 78 preferably includes a unique cushioned support 116 to support the bottom edge 76 of the window glass 12, where the cushioned support 116 comprises a generally rectangular horizontally extending glass support member 118 including a retaining member, or clip, 120 and a cushion 122 receivable by the horizontally extending member 118 and securable by the retaining member 120. The cushioned support has a sleeve configuration and is designed to support the bottom edge 76 of the window glass 12 and reduce moment loading on the carrier 20. More specifically, the horizontally extending member 118 is generally integrally formed with the slide 78 and thus comprises the same material as the slide 78, commonly POM, and defines a free outboard end 118*a*. Certain prior art window regulators incorporating a slide with horizontally extending supports can result in noise when the window glass 12 rubs against the support. Others have attempted to solve this problem by rounding the edges of the support. Still others have provided an extension of material from a clamp cushion, like clamp cushion 84, to provide a cushion between the support and the window. However, these solutions do not address the problem of wear based upon the rubbing of the window against the support and sometimes do not address the problem of moment loading on the carrier 20. Extensive investigation of a variety of designs and materials was required to address the dual problems of moment loading on the carrier 20 and of wear. So called "slippery" materials forming the cushion 122 surrounding the member 118 and retained using the retaining clip 120 such as polyethylene proved unsatisfactory because of their brittleness caused them to easily crack. Materials that deform but do not break proved to be satisfactory. The best choice was a polypropylene material forming the cushion 122 and engaged with the member 118 with the clip 120. Retaining member 120 is formed as a protuberance proximate the free outboard end 118*a* of the glass support member 118 and defines an inboard vertical edge 120*a*. Sleeve 122 is sized to be fitted snugly over the outboard end 118*a* of the glass support member 118 and protuberance 120 is sized to allow passage of the inboard annular edge 122*a* of the sleeve cushion thereover and onto the glass support member such that the inboard edge 120*a* of the retaining member thereafter engages the outboard annular edge 122*b* of the sleeve cushion to preclude inadvertent separation of the sleeve cushion from the glass support member.

The slide 78 additionally includes a first pair of rail mounting members 124, 126 and a second pair of rail mounting members 128, 130 (both best shown in FIGS. 7-8) for mounting the slide 78 to the first rail 16 to allow for movement of the slide 78 and thus the first glass carrier 20 relative to the first rail 16. Further, the slide 78 includes a clamp aperture 132 (see FIG. 6) for receiving the slide connection member 102 of the clamp 74 and a clamp retaining member 134 (see FIG. 7) for engaging the slide retainer aperture 104 (see FIG. 4) of the clamp 74 to connect the slide 78 to the clamp 74. The slide retainer aperture 104 of the clamp 74 and the clamp retaining member 134 of the slide 78 are sized to allow horizontal movement of the clamp 74 relative to the slide 78 to compensate for slight variations in the relative positions between the first rail 16 and the second rail 18 such as where they are not exactly parallel.

The slide 82 of the second glass carrier 22 is a mirror image with respect to the cushioned support 116, the first pair of rail mounting members 124, 126, the second pair of rail mounting members 128, 130, the clamp aperture 132 and the clamp retaining member 134 so only slide 78 has been discussed in these areas.

As seen in FIGS. 1 and 2, the slide 82 of the second glass carrier 22 includes a generally circular first aperture or bore 136 associated with a vertically extending second aperture or first channel 138, and a generally circular third aperture or second bore 140 associated with a vertically extending fourth aperture or second channel 142. The second end 64 of the second cable 26 is received by the first bore 136 and the second length 58 is received by the first channel 138 to attach the second cable 26 to the slide 82 and thus to the second glass carrier 22 in a generally parallel orientation relative to the track defined by the second rail 18. The first cable end 70 of the third cable 28 is received by the second bore 140 and the third cable length 66 is received by the second channel 142 to attach the third cable 28 to the slide 82 and thus to the second glass carrier 22 in a generally parallel orientation relative to the second rail 18. The slide 82 includes a generally cylindrical slide cushion 143, as shown in FIG. 1, for preventing direct contact between the slide 82 and the second rail 18 when the window glass 12 is in a lowered position. The material of the slide cushion 143 is preferably a material that is more elastic than the material of the slide 82.

Figure 8:
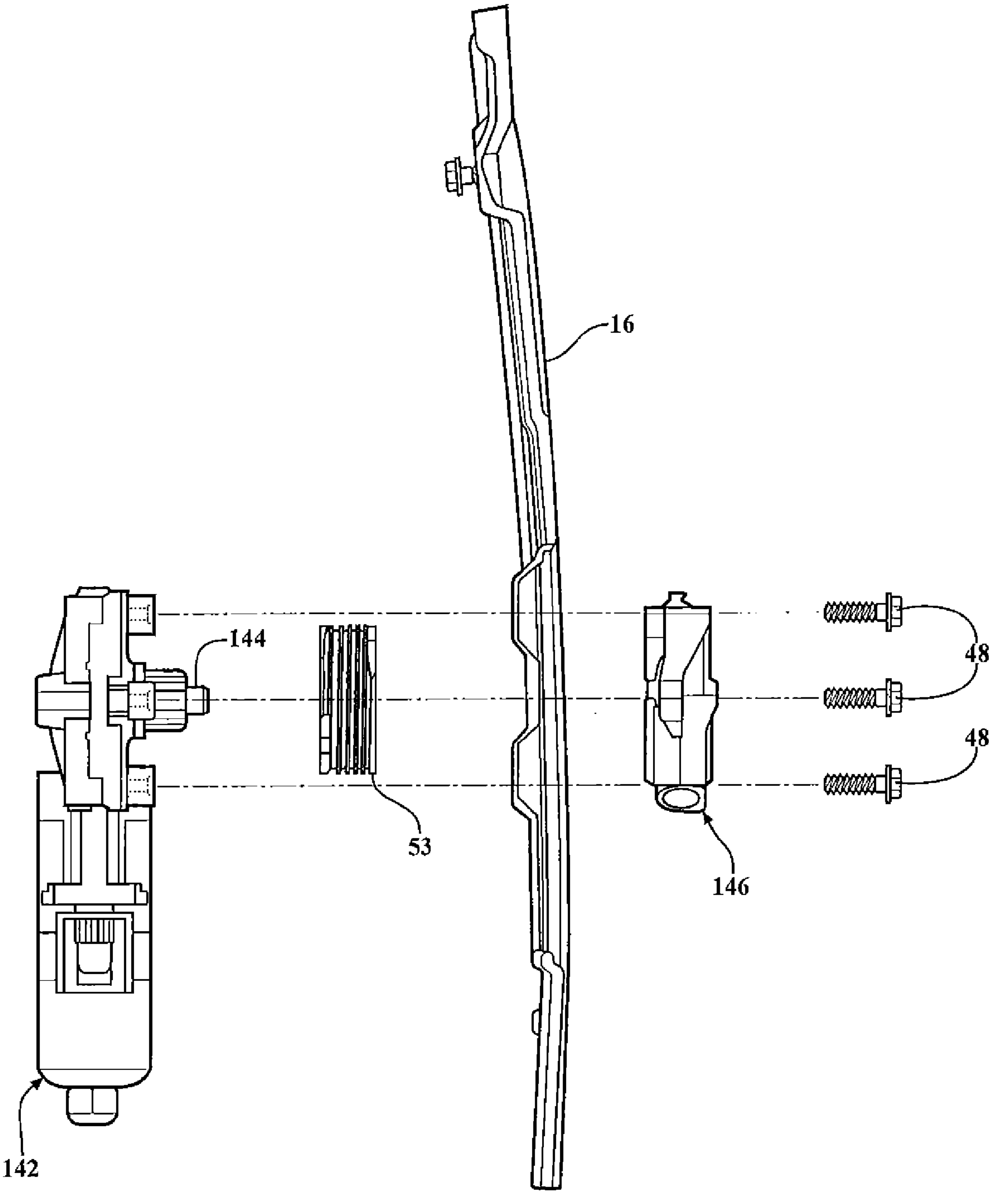
Figure 9:
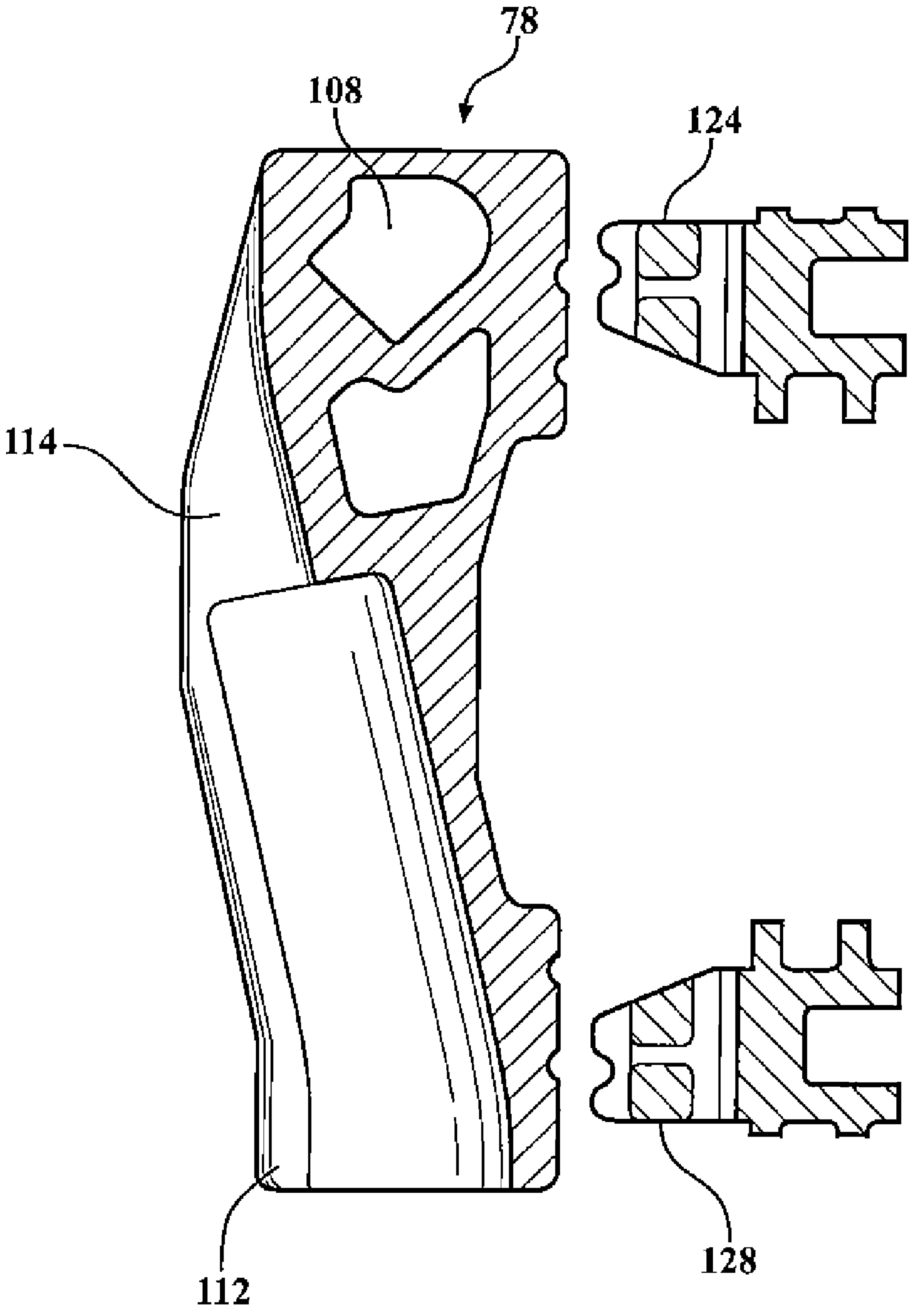
FIG. 9 is a cross sectional view of the side of the first glass carrier as seen through line 9-9 of FIG. 6.

The drive unit 30 includes the drum 53, a motor 142 including an output shaft 144, and a housing 146, as best seen in FIGS. 1 and 8. The drum 53 is mounted onto the output shaft 144. The motor 142 is attached to the first rail 16 and to the housing 146 using multiple fasteners 148 or other such suitable methods of attachment as are known in the industry. Alternately, the motor 142 can be attached to second rail 18.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A window regulator for raising and lowering window glass of a motor vehicle comprising:

a vertical rail defining a vertical track;

a glass carrier including a U-shaped upwardly opening clamp for receiving the window glass and a slide coupled to the clamp and mounted for sliding movement along the track;

first and second cables secured to the slide;

a drive unit for operably engaging the cables to move the glass carrier along the track;

a glass support member extending horizontally from a side face of the slide and defining a free outboard end;

a cushion formed of a plastic material different than the material of the slide, having a sleeve configuration, sized to be fitted over the free outboard end of the glass support member, and having an inboard annular edge and an outboard annular edge; and a retaining member formed as a protuberance on the glass support member proximate the free outboard end of the glass support end and sized to allow passage of the inboard annular edge of the sleeve cushion thereover and onto the glass support member and thereafter engaging the outboard annular edge of the sleeve cushion to preclude inadvertent separation of the sleeve cushion from the support member.

2. A window regulator according to claim 1 wherein the sleeve cushion is formed of a polypropylene material.

3. A window regulator according to claim 1 wherein the clamp is formed of a metallic material and the slide of formed of a plastic material.

4. A window regulator according to claim 1 wherein the retaining member defines an inboard vertical edge which engages the outboard annular edge of the sleeve cushion with the sleeve cushion positioned on the glass support member.

5. A window regulator according to claim 1 wherein the glass support member and the sleeve cushion have a generally rectangular cross-sectional configuration.

* * * * *